(12) United States Patent
Hansson

(10) Patent No.: US 6,882,863 B2
(45) Date of Patent: Apr. 19, 2005

(54) PORTABLE COMMUNICATION APPARATUS HAVING AN OPTICAL OR MAGNETIC READING DEVICE

(75) Inventor: Magnus Hansson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 551 days.

(21) Appl. No.: 09/745,391

(22) Filed: Dec. 22, 2000

(65) Prior Publication Data

US 2001/0041581 A1 Nov. 15, 2001

(30) Foreign Application Priority Data

Dec. 29, 1999 (SE) .............................................. 9904825

(51) Int. Cl.[7] .............................................. H04M 1/00
(52) U.S. Cl. ..................... 455/556.1; 455/557; 455/344
(58) Field of Search .............................. 455/41.1, 41.2, 455/550.1, 556.1, 557, 90.2, 90.3, 344, 419, 422.1; 359/802, 803; 324/200, 260

(56) References Cited

U.S. PATENT DOCUMENTS

| | | | | |
|---|---|---|---|---|
| 4,716,576 A | * | 12/1987 | Sakai et al. ..................... 455/79 |
| 5,465,401 A | | 11/1995 | Thompson .................... 455/89 |
| 5,604,640 A | * | 2/1997 | Zipf et al. .................... 359/803 |
| 5,923,735 A | * | 7/1999 | Swartz et al. ................ 455/557 |
| 6,212,401 B1 | * | 4/2001 | Ackley ...................... 455/556.1 |
| 6,424,830 B1 | * | 7/2002 | O'Hagan et al. ......... 455/422.1 |
| 6,493,550 B1 | * | 12/2002 | Raith .......................... 455/41.2 |
| 6,566,872 B1 | * | 5/2003 | Sugitani ...................... 324/260 |
| 6,577,861 B1 | * | 6/2003 | Ogasawara ................. 455/419 |

FOREIGN PATENT DOCUMENTS

| | | |
|---|---|---|
| EP | 0301740 A2 | 2/1989 |
| EP | 0529721 A2 | 3/1993 |
| EP | 0645728 A2 | 3/1995 |
| GB | 2246491 A | 1/1992 |
| WO | WO 97/20420 | 6/1997 |

OTHER PUBLICATIONS

Landström, R., International–Type Search Report, Search Request No. SE 99/01771, Nov. 30, 2000, pp. 1–3.

* cited by examiner

*Primary Examiner*—Quochien B. Vuong
(74) *Attorney, Agent, or Firm*—Jenkens & Gilchrist, P.C.

(57) ABSTRACT

A portable communication apparatus has a microphone and a processing device with an input operatively coupled to the microphone. The processing device generates a digital output signal from a first electric signal received from the microphone. A reading device in the portable communication apparatus generates a second electric signal from an optical or magnetic input signal. The processing device is operatively coupled to the reading device, so that the second electric signal from the reading device may be received at the input of the processing device.

12 Claims, 3 Drawing Sheets

PORTABLE COMMUNICATION APPARATUS HAVING AN OPTICAL OR MAGNETIC READING DEVICE

TECHNICAL FIELD

The present invention relates to portable communication apparatuses of the type having a microphone and a processing device with an input operatively coupled to the microphone, where the processing device generates a digital output signal from an analog electric signal received from the microphone, and where the apparatus also has an optical or magnetic reading device, such as a barcode reader or a magnetic card reader.

HISTORY OF RELATED ART

A portable communication apparatus according to the above is known from e.g. EP-A-0 529 721, FIG. 2 of which discloses a mobile telephone 2 having an integrated barcode reader 16, by means of which a bar-coded telephone number may be scanned into the mobile telephone without having to dial the telephone number manually on the telephone keyboard 4.

A similar portable communication apparatus is shown in EP-A-0 645 728, where again a mobile telephone is provided with an integrated barcode reader. WO97/20420 discloses a mobile telephone having an accessory connector and an external barcode reader connected by a cable to this accessory connector.

EP-A-0 301 740 discloses a portable radio telephone including a magnetic card reader.

The portable communication apparatuses known from the above all have in common that the provision of a reading device internally in or externally to the apparatus requires additional functionality and hardware, as compared to a "normal" portable communication apparatus (such as a typical mobile telephone) without any such reading device. The additional functionality and hardware are required for receiving, processing and interpreting the electric analog output signal from the reading device. For instance, in case the reading device is a barcode reader, it will typically supply, as an output signal, an analog electric signal reflecting the alternating patterns of black and white lines in the barcode pattern. This analog signal will have to be amplified, converted to digital form and further processed in order to extract the digital information stored therein.

SUMMARY OF THE INVENTION

It is an object of the present invention to allow a portable communication apparatus to be provided with a reading device as set out above, essentially without having to add any new functionality or hardware to the portable communication apparatus.

The object has been achieved by the following inventive understanding. A portable communication apparatus is typically provided with a microphone, which converts an acoustic input into an analog electric output signal. This analog signal is amplified, converted to digital form and filtered and processed by e.g. a digital signal processor, before it is forwarded to a speech/channel encoder module and a radio transmitter module, so as to ultimately be transmitted from an antenna of the apparatus.

An optical or magnetic reading device (such as a barcode reader or a magnetic card reader), on the other hand, also outputs an analog electric signal. According to the invention the output signal from the reading device is supplied to the same signal path as the analog electric output signal from the microphone, i.e. to the components for amplifying the signal, converting it to digital form and filtering/processing it in a digital signal processor.

According to a preferred embodiment, a switching device is provided between the microphone/reading device and the signal path for amplifying/converting/processing the output signals thereof, so that the switching device in a first position may forward the analog electric output signal from the microphone to the aforesaid signal path, while in a second position instead the analog electric output signal from the reading device will be forwarded to the same signal path.

The present invention has a distinct advantage in that it requires no extra components for amplifying, A/D converting and filtering/processing the analog electric output signal from the reading device in order to receive, extract and interpret the digital information in question.

Other objects, advantages and features of the present invention will appear from the following detailed disclosure of preferred and alternative embodiments, from the drawings as well as from the appended claims.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The preferred and alternative embodiments of the present invention will now be described in more detail, reference being made to the accompanying drawings, in which.

DETAILED DISCLOSURE OF EMBODIMENTS

Figure 1:
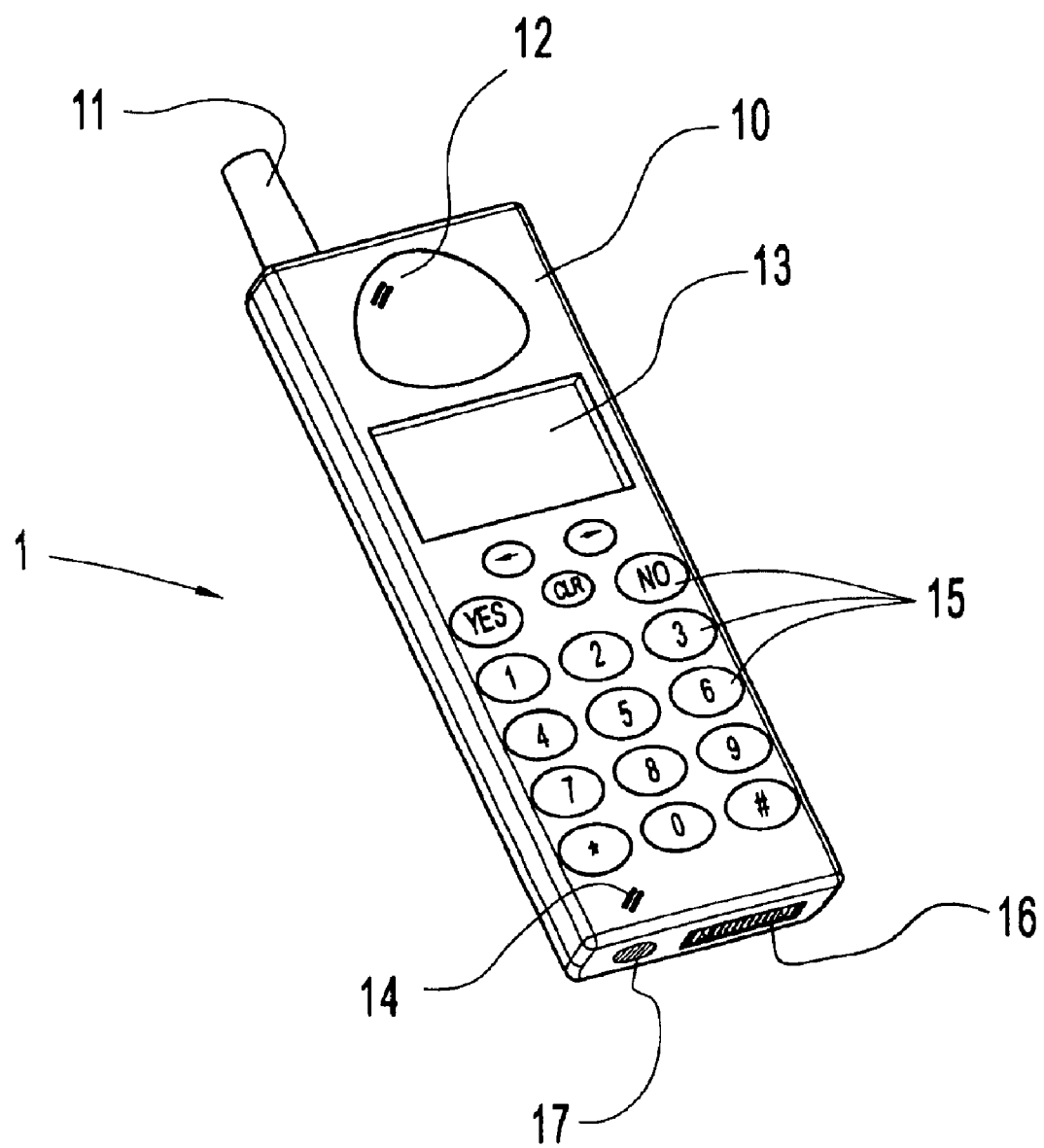
FIG. 1 is a schematic view of a portable communication apparatus according to the invention in the form of a mobile telephone with an integrated barcode reader.

FIG. 1 illustrates a portable communication apparatus according to a preferred embodiment of the invention. For the rest of this specification, the portable communication apparatus will be exemplified by, and referred to as, a mobile telephone 1. However, the portable communication apparatus may equally well be e.g. a personal computer, a laptop computer, a hand-held computer, a PDA (Personal Digital Assistant), a smartphone, or any other apparatus that falls within the definitions in the appended claims.

The mobile telephone 1 comprises an apparatus housing 10, an antenna 11 mounted on top of the housing, as well as a loudspeaker 12, a visual display 13 and a microphone 14, all of which are provided at a front portion of the apparatus housing 10.

Moreover, the mobile telephone 1 comprises a telephone keypad 15 having a plurality of numeric keys, each of which represents a respective digit 0 through 9. A * key and a # key are also provided on the keypad 15.

The keypad 15 also comprises a YES key, which is used for answering an incoming call and for performing an affirmative action in the man-machine interface of the mobile telephone 1. Similarly, a NO key has a function for terminating an ongoing call and for providing a negative response in the man-machine interface. The NO key may also be used as a power-on key for turning on the mobile telephone 1.

Additionally, the telephone keypad 15 comprises a clear key, which for instance may be used for resetting the man-machine interface to an initial state (escaping from any option within a menu system provided by the man-machine interface), and arrow keys, which are used for scrolling through different options in the man-machine interface.

The mobile telephone 1 also comprises, at a lower end of the apparatus housing 10, an accessory connector 16 (sometimes referred to as system connector), which may be used for connecting the mobile telephone 1 to a commercially available accessory device, such as a hands-free set or a battery charger.

Finally, next to the accessory connector 16 an integrated barcode reader 17 is provided (only the lens thereof is indicated in FIG. 1). Up to this point, the mobile telephone 1 as well as the components described above are all essentially known per se.

Figure 2:
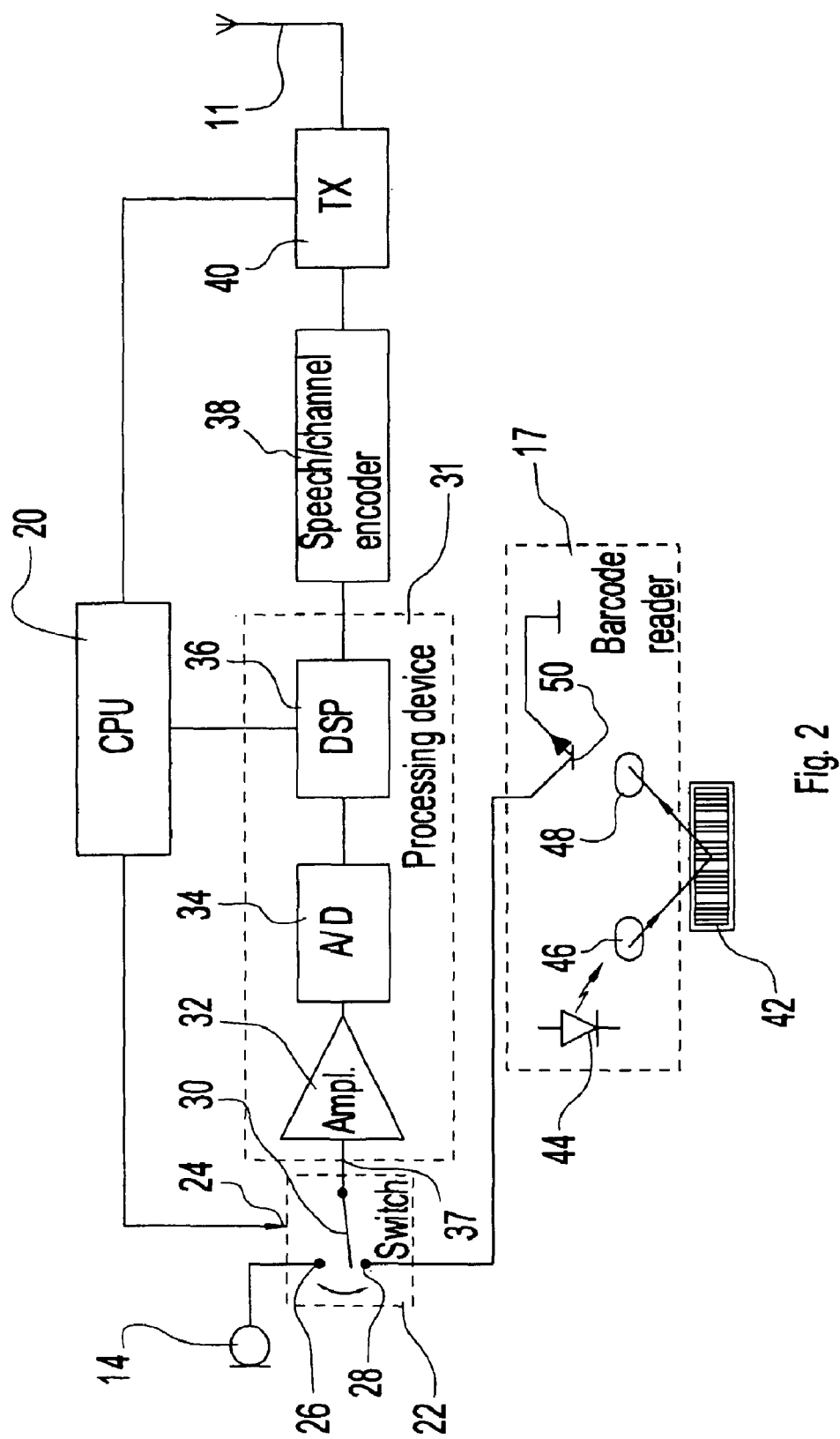
FIG. 2 is a schematic block diagram of the mobile telephone in FIG. 1.

The internal structure of the mobile telephone 1 and its integrated barcode reader 17 is shown in more detail in FIG. 2. Starting to the left of the drawing, the microphone 14 is connected to a first input terminal 26 of a switch 22. A second terminal 28 of the switch 22 is connected to an output 50 of the barcode reader 17. A control input 24 of the switch 22 is connected to a central controller (CPU) 20. The switch 22 comprises a movable contact element 30, by means of which either the first input terminal 26 (and consequently the output of the microphone 14) or the second input terminal 28 (and consequently the output of the barcode reader 17) may be coupled to an input 37 of a signal path for amplifying, A/D converting and processing the analog electric output signal from the microphone 14 and the barcode reader 17, respectively.

This signal path comprises an amplifier 32, an A/D converter 34 and a digital signal processor (DSP) 36, which are jointly referred to as a processing device 31 in the following.

Referring first to a "normal" situation, where the output from the microphone 14 is forwarded through the switch 22 to the processing device 31, the operation is as follows. An acoustic signal, emanating from the voice of the telephone user, is intercepted by the microphone, which in a well-known manner will convert the acoustic signal to an analog electric output signal, that is supplied to aforesaid first terminal 26 of the switch 22. Initially, the movable contact element 30 has been set to its first position according to the above by submitting a control signal to the control input 24 from the CPU 20.

The analog electric microphone signal is received at the input 37 of the processing device 31 and is amplified by the amplifier 32. Then, the analog microphone signal is converted to digital form by the A/D converter 34, and the resulting digital signal is supplied to the DSP 36, which is provided with software for performing various amplifying, filtering and other signal-improving functions, as is generally known per se. The thus obtained digital voice signal is supplied to a device 38 for performing speech encoding and channel encoding according to the particular mobile communications protocols, under which the mobile telephone 1 operates. The encoded signal is forwarded to a radio transmitter 40, where the signal in a well-known manner will be modulated onto a high-frequency carrier wave, which is transmitted as electromagnetic radiation by means of the antenna 11.

If, on the other hand, the information stored on a barcode label 42 is to be read through the barcode reader 17, the controller 20 will switch the contact element 30 to its second position, wherein instead the second input terminal 28 of the switch 22 is operatively connected to the output 50 of the barcode reader 17.

As shown in FIG. 2, the barcode reader 17 comprises a photo emitter 44 in the form of a photo diode, which is adapted to transmit a beam of light through a first lens 46 onto the surface of the barcode label 42. Light reflected from the barcode label 42 will be received by a photo detector 50 through a second lens 48. At the output of the photo detector 50 an analog electric output signal will be provided, which represents the varying pattern of black and white lines on the barcode label 42. Since the reading of the barcode label 42 is carried out optically, the analog electric barcode reader signal may contain a substantial amount of noise due to surrounding light, imperfections in the surface of the barcode label 42, etc.

As is well-known per se, barcode labels are used for representing digital information, for instance numerical digits or ASCII characters, by means of vertical black and white lines having varying widths. The barcode reader 17 may be used for reading various commercially available barcodes, such as EAN 8, EAN 13, UPC A, UPC E, UCC/EAN-128, Code 128, Code 39, Codabar, Code 11, MSI Code, Code 93, or ITF 14.

The barcode reader 17 may advantageously be implemented by a commercially available photo reflector, such as any of the following photo reflectors produced by Hewlett Packard: HBCC-1570, HBCC-1580, HBCC-1590, HBCS-1100, HEDS-1200 or HEDS-1300. Alternatively, any of the following photo reflectors from Sharp may be used: GP2S22, GP2L22, SG-2BC or GP2S05. Alternatively, the following photo reflectors are available from Optek: OPB707C, OPB710F or OPB730F, or the RPR-359F or RPR-220 from Rohm.

The analog electric barcode signal will be supplied through the second switch terminal 28 to the input 37 of the processing device 31, wherein the analog and potentially weak signal will be amplified by the amplifier 32, converted to digital form by the A/D converter 34 and received at the DSP 36. The DSP 36 is programmed to perform various signal-processing operations required for extracting the digital information stored on the barcode label 42. In many aspects the analog barcode reader signal has characteristics similar to those of the analog microphone signal; therefore, it will be a reasonably simple task for a skilled man to program the DSP 36 to be capable of handling both the analog microphone signal and the analog barcode reader signal.

More specifically, the DSP 36 of the preferred embodiment may be programmed to perform the following operations on the digital barcode reader signal received from the A/D converter 34: automatic gain control (so that weaker input signals will be more amplified than stronger input signals), bandpass filtering (the desired signal lies within 50–400 Hz), oversampling (in order to increase the quality of the digital barcode reader signal) correlation, and timebase compensation. Timebase compensation may be required to compensate for a likely real-life situation, where the telephone 1 will be swept over the barcode label 42 at different speeds from time to time. Moreover, the sweep speed may in some cases be non-constant, so that the timebase will have to be stretched or compressed.

Once the digital information of the barcode label 42 has been finally extracted by the DSP 36, the results will be supplied to the CPU 20 to be used for its intended purpose. Typical barcode applications of the mobile telephone 1 according to the invention include reading a bar-coded telephone number to be called by the mobile telephone 1; reading a string of characters and/or digits to be transformed by the CPU 20 into a digital message, which may be transmitted to a remote receiver in for instance an SMS message (Short Message Services in GSM): reading an authenticating code from the barcode label 42 to be submitted to e.g. a WAP application on a remote Internet server, etc.

Figure 3:
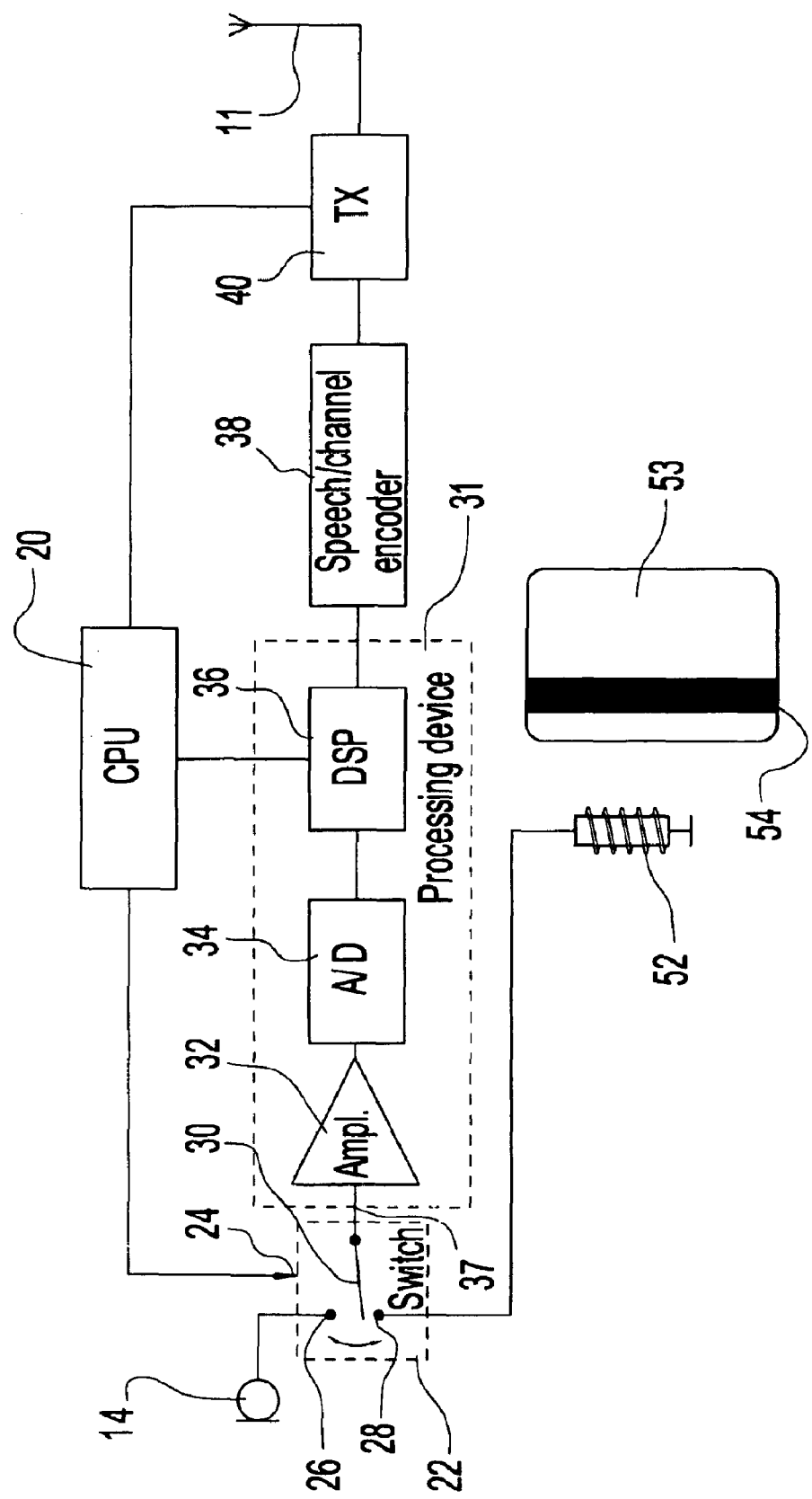
FIG. 3 is a schematic block diagram of an alternative embodiment of the invention, where the integrated barcode reader of FIGS. 1 and 2 has been substituted for a magnetic card reader.

Referring now to FIG. 3, an alternative embodiment of the present invention is shown. In FIG. 3, the integrated reader 17 has been replaced by a magnetic card reader 52, comprising a magnetic sensor (exemplified by a coil in FIG. 3), which is arranged to inductively read the contents stored magnetically in a magnetic strip 54 on a plastic card 53. The output of the magnetic card reader 52 is an analog electric signal, which is similar to the analog output signals of the aforesaid barcode reader 17 and the microphone 14, respectively. Therefore, the rest of the components shown in FIG. 3 may operate in essentially the same way, as has already been described above with reference to FIG. 2.

The present invention has been described above with reference to a preferred and an alternative embodiment. However, the present invention shall in no way be limited by the above disclosure. On the contrary, the scope of the present invention is only limited by the definitions in the appended independent patent claim. In particular, even if it is currently believed that the barcode reader 17 and the magnetic card reader 52, respectively, preferably be integrated in the mobile telephone 1, the reader may alternatively be realized as an external unit, which is connected to the mobile telephone 1 by means of a cable inserted into the accessory connector 16.

What is claimed is:

1. A portable communication apparatus comprising:
   a microphone for generating a first analog electric signal;
   a reading device adapted to generate a second analog electric signal from an optical or a magnetic input signal;
   a switching device having a first input coupled to the microphone, a second input coupled to the reading device, and a control input for receiving a control signal for selecting whether the first or the second analog electric signal is to be forwarded to a processing device;
   wherein the processing device has an input coupled to an output of the switching device for receiving either the first or the second analog electric signal; and
   wherein the processing device is adapted to process the first and second analog electric signals through a single signal path.

2. The portable communication apparatus as in claim 1, wherein the reading device comprises an optical emitter and an optical receiver for reading information stored in a barcode.

3. The portable communication apparatus as in claim 1, wherein the reading device comprises a magnetic sensor for reading information stored in a magnetic strip on a card.

4. The portable communication apparatus as in claim 3, wherein the magnetic sensor comprises a coil.

5. The portable communication apparatus as in claim 1, wherein the processing device comprises:
   an amplifier adapted to amplify the first and second analog electric signals;
   an A/D converter adapted to convert the first and the second analog electric signal to a first and a second digital electric signal; and a digital signal processor.

6. The portable communication apparatus as in claim 1, wherein the apparatus is a radio telephone.

7. The portable communication apparatus as in claim 6, wherein the radiotelephone comprises a mobile telephone.

8. The portable communication apparatus as in claim 1, wherein the reading device is integrated inside an apparatus housing of the portable communication apparatus.

9. The portable communication apparatus as in claim 1, wherein the reading device is located outside an apparatus housing of the portable communication apparatus and is connected through an accessory connector provided in the apparatus housing.

10. A portable communication apparatus comprising:
    a microphone for generating a first electric signal;
    a reading device adapted to generate a second analog electric signal from an optical or a magnetic input signal;
    a switching device having a first input coupled to the microphone, a second input coupled to the reading device, and a processing device having an input coupled to an output of the switching device for receiving either the first or the second analog electric signal; and
    wherein the processing device is adapted to process the first and second analog electric signals through a single signal path.

11. A portable communication apparatus comprising:
    a microphone for generating a first analog electric signal;
    a reading device adapted to generate a second analog electric signal from an optical or a magnetic input signal;
    a switching device having a first input coupled to the microphone, a second input coupled to the reading device, and a control input for receiving a control signal for selecting whether the first or the second analog electric signal is to be forwarded to a processing device; and
    wherein an output of the switching device is coupled to an input of the processing device for receiving either the first or the second analog electric signal based on the control signal.

12. The portable communication apparatus as in claim 11, wherein the processing device is adapted to process the first and second analog electric signals through a single signal path.

* * * * *

UNITED STATES PATENT AND TRADEMARK OFFICE
CERTIFICATE OF CORRECTION

PATENT NO. : 6,882,863 B2  
APPLICATION NO. : 09/745391  
DATED : April 19, 2005  
INVENTOR(S) : Hansson Page 1 of 1

It is certified that error appears in the above-identified patent and that said Letters Patent is hereby corrected as shown below:

In Column 6, Line 27, in Claim 10, after "first" insert -- analog --.

Signed and Sealed this

Thirteenth Day of May, 2008

JON W. DUDAS  
*Director of the United States Patent and Trademark Office*